US011227342B2

(12) United States Patent
Wu et al.

(10) Patent No.: US 11,227,342 B2
(45) Date of Patent: Jan. 18, 2022

(54) RECOMMENDING FRIENDS IN AUTOMATED CHATTING

(71) Applicant: MICROSOFT TECHNOLOGY LICENSING, LLC, Redmond, WA (US)

(72) Inventors: Xianchao Wu, Redmond, WA (US); Katsuya Iida, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/616,842

(22) PCT Filed: May 26, 2017

(86) PCT No.: PCT/CN2017/086191
§ 371 (c)(1),
(2) Date: Nov. 25, 2019

(87) PCT Pub. No.: WO2018/214164
PCT Pub. Date: Nov. 29, 2018

(65) Prior Publication Data
US 2020/0234384 A1 Jul. 23, 2020

(51) Int. Cl.
*G06Q 50/00* (2012.01)
*G06F 16/9535* (2019.01)
(Continued)

(52) U.S. Cl.
CPC ......... *G06Q 50/01* (2013.01); *G06F 16/9024* (2019.01); *G06F 16/9535* (2019.01); *H04L 51/32* (2013.01); *H04L 65/403* (2013.01)

(58) Field of Classification Search
CPC ......... H04L 29/08936; H04L 51/00–04; H04L 51/32; H04L 67/306; G06Q 50/01; G06N 5/00–027
See application file for complete search history.

(56) References Cited

U.S. PATENT DOCUMENTS

| 7,159,011 B1 * | 1/2007 | Knight | G06Q 10/107 709/207 |
| 8,977,641 B1 * | 3/2015 | Crichton | G06Q 50/01 707/767 |

(Continued)

FOREIGN PATENT DOCUMENTS

| CN | 103166834 A | 6/2013 |
| CN | 103268330 A | 8/2013 |

(Continued)

OTHER PUBLICATIONS

"Tuple". IEEE 100, the Authoritative Dictionary of IEEE Standards Terms, 7th Edition, 2000.*

(Continued)

*Primary Examiner* — Brendan Y Higa
(74) *Attorney, Agent, or Firm* — Newport IP, LLC; Leonard J. Hope

(57) ABSTRACT

The present disclosure provides method and apparatus for recommending friends in automated chatting. A message is received from a user in a chat flow. An intention of looking for friends is identified from the message. One or more recommended friends are identified based on a topic knowledge graph. The recommended friends are provided in the chat flow.

20 Claims, 10 Drawing Sheets

(51) Int. Cl.
*G06F 16/901* (2019.01)
*H04L 12/58* (2006.01)
*H04L 29/06* (2006.01)

(56) References Cited

U.S. PATENT DOCUMENTS

| | | | | |
|---|---|---|---|---|
| 9,542,503 B2* | 1/2017 | Franceschini | | G06N 7/005 |
| 2005/0216444 A1* | 9/2005 | Ritter | | H04L 61/1552 |
| 2009/0164897 A1* | 6/2009 | Amer-Yahia | | G06F 3/00 |
| | | | | 715/703 |
| 2010/0079336 A1* | 4/2010 | Skibiski | | G06Q 30/02 |
| | | | | 342/357.31 |
| 2010/0223341 A1* | 9/2010 | Manolescu | | H04L 51/063 |
| | | | | 709/206 |
| 2011/0252108 A1* | 10/2011 | Morris | | H04L 51/32 |
| | | | | 709/206 |
| 2011/0282798 A1* | 11/2011 | Zheng | | G06Q 30/02 |
| | | | | 705/319 |
| 2012/0136689 A1* | 5/2012 | Ickman | | G06Q 50/01 |
| | | | | 705/7.19 |
| 2012/0297038 A1* | 11/2012 | Mei | | G06Q 50/01 |
| | | | | 709/223 |
| 2014/0040245 A1* | 2/2014 | Rubinstein | | G06F 16/24575 |
| | | | | 707/722 |
| 2014/0059040 A1* | 2/2014 | Cha | | G06F 16/3347 |
| | | | | 707/722 |
| 2014/0108333 A1* | 4/2014 | Jain | | H04L 67/22 |
| | | | | 707/609 |
| 2014/0229322 A1* | 8/2014 | Ranganath | | G06Q 30/0631 |
| | | | | 705/26.7 |
| 2014/0365504 A1* | 12/2014 | Franceschini | | G06N 5/046 |
| | | | | 707/748 |
| 2015/0271126 A1* | 9/2015 | Menayas | | H04W 4/02 |
| | | | | 709/206 |
| 2015/0370798 A1* | 12/2015 | Ju | | G06F 16/24578 |
| | | | | 707/748 |
| 2016/0021179 A1* | 1/2016 | James | | G06Q 10/10 |
| | | | | 709/204 |
| 2016/0042069 A1* | 2/2016 | Lee-Goldman | | G06F 40/295 |
| | | | | 707/706 |
| 2016/0063093 A1* | 3/2016 | Boucher | | G06F 16/90324 |
| | | | | 707/748 |
| 2016/0092040 A1* | 3/2016 | Sherman | | H04L 51/32 |
| | | | | 715/752 |
| 2016/0098493 A1* | 4/2016 | Primke | | H04L 65/403 |
| | | | | 707/754 |
| 2016/0179908 A1* | 6/2016 | Johnston | | G06F 16/9537 |
| | | | | 707/724 |
| 2016/0248711 A1* | 8/2016 | Huo | | G06Q 10/10 |
| 2017/0032257 A1* | 2/2017 | Sharifi | | G06N 20/00 |
| 2017/0039188 A1* | 2/2017 | Allen | | G06F 8/73 |
| 2017/0093934 A1* | 3/2017 | Napper | | G06Q 50/01 |
| 2017/0109446 A1* | 4/2017 | Wu | | G06F 7/02 |
| 2017/0148055 A1* | 5/2017 | Boothroyd | | H04L 51/046 |
| 2017/0295119 A1* | 10/2017 | Rosenberg | | G06Q 30/0631 |
| 2017/0337184 A1* | 11/2017 | Quah | | H04L 51/16 |
| 2018/0082265 A1* | 3/2018 | Chan | | G06Q 10/1095 |
| 2018/0150739 A1* | 5/2018 | Wu | | G06N 3/006 |
| 2018/0181855 A1* | 6/2018 | Johnson, Jr. | | G06N 5/022 |
| 2018/0196796 A1* | 7/2018 | Wu | | G06F 16/9024 |
| 2019/0050945 A1* | 2/2019 | Ash | | H04L 67/22 |
| 2019/0147366 A1* | 5/2019 | Sankaran | | G06N 3/0445 |
| | | | | 706/12 |
| 2020/0202194 A1* | 6/2020 | Wu | | G06N 3/004 |

FOREIGN PATENT DOCUMENTS

| | | |
|---|---|---|
| CN | 105183848 A | 12/2015 |
| CN | 106204295 A | 12/2016 |
| WO | 2015122691 A1 | 8/2015 |
| WO | 2015/187048 A1 | 12/2015 |

OTHER PUBLICATIONS

International Search Report and Written Opinion for PCT/CN2017/086191, dated Jan. 29, 2018.

"About Plaxo", Retrieved from: https://www.plaxo.com/about/plaxo, Jul. 8, 2014, 3 Pages.

Jost, et al., "Suggesting New Interactions Related to Events in a Social Network for Elderly", In Proceedings of the 2nd International Workshop on Design and Implementation of Independent and Assisted Living Technology, Sep. 2012, 4 Pages.

Silva, Eliezer De Souza Da, "New Probabilistic Models for Recommender Systems with Rich Contextual and Content Information", In Proceedings of the 10th ACM International Conference on Web Search and Data Mining, Feb. 6, 2017, 1 Page.

"Extended European Search Report Issued in European Patent Application No. 17911191.9", dated Sep. 28, 2020, 9 Pages.

* cited by examiner

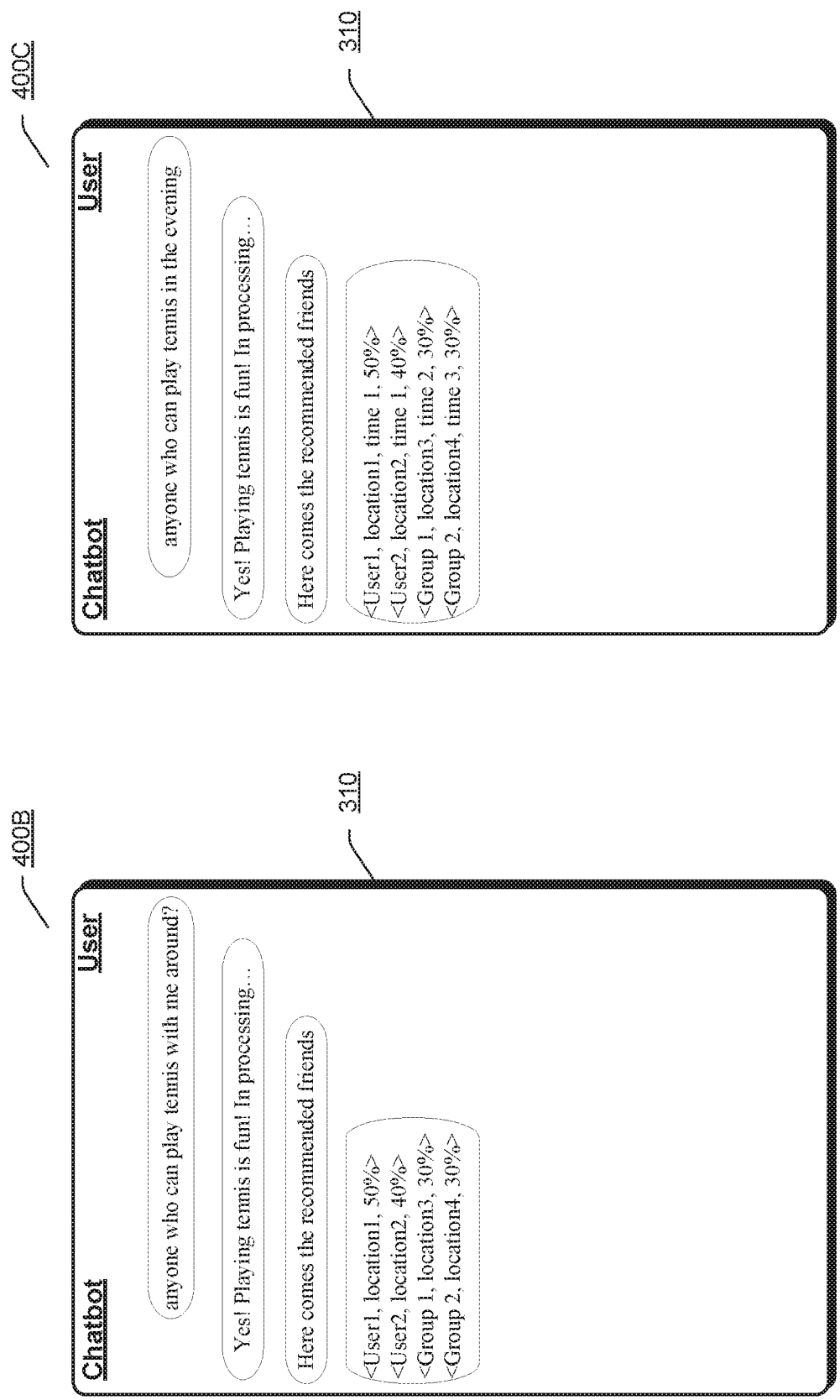

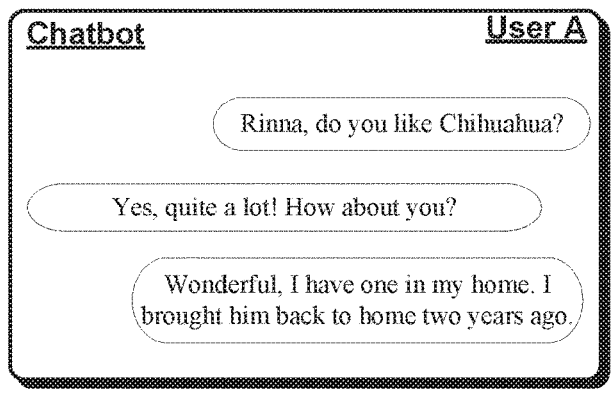
— 610

— 620

Rinna , do you like <u>Chihuahua</u> ?

Wonderful , I have <u>one</u> in my home .

I brought <u>him</u> back to home two years ago .

— 630

Rinna , do you like <u>Chihuahua</u> ?

Wonderful , I have <u>Chihuahua</u> in my home .

I brought <u>Chihuahua</u> back to home two years ago .

— 640 object   location
Wonderful , I have Chihuahua in my home .

object   location
I brought Chihuahua back to home <u>two years ago</u> .
                                    time

— 650

<user A, 2015, home, Chihuahua, brought, 0.8>

<user A, 2017, home, Chihuahua, in, 0.8>

*FIG 6*

RECOMMENDING FRIENDS IN AUTOMATED CHATTING

This application is a U.S. National Stage Application of PCT/CN2017/086191, filed May 26, 2017, which application is hereby incorporated by reference. To the extent appropriate, a claim of priority is made to the above disclosed application.

BACKGROUND

Artificial Intelligence (AI) chatbot is becoming more and more popular, and is being applied in an increasing number of scenarios. The chatbot is designed to simulate people's conversation, and may chat with users by text, speech, image, etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method for recommending friends in automated chatting. A message is received in a chat flow. An intention of looking for friends is identified from the message. One or more recommended friends are identified based on a topic knowledge graph. The recommended friends are provided in the chat flow.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 4A-4D each illustrates an exemplary chat flow according to an embodiment.

FIG. 6 illustrates an exemplary process for constructing user-topic knowledge graph according to an embodiment.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Figure 1:
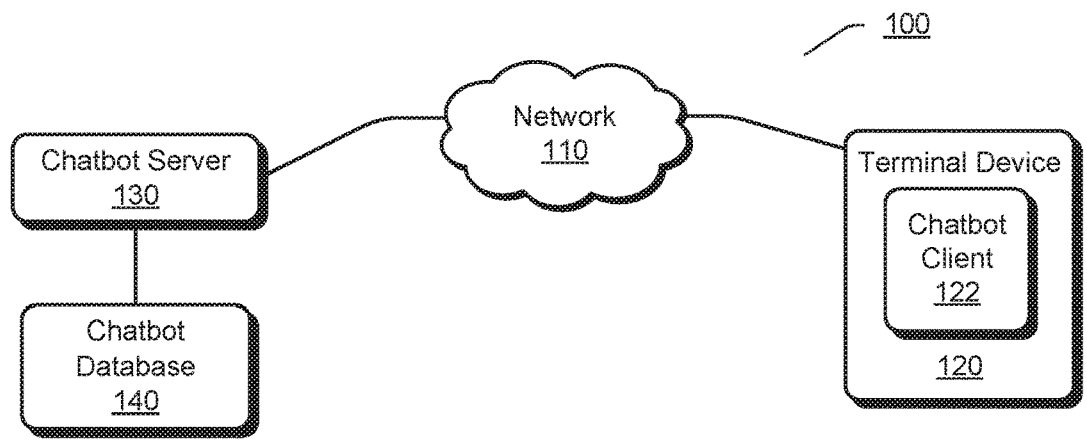
FIG. 1 illustrates an exemplary application scenario of a chatbot according to an embodiment.

FIG. 1 illustrates an exemplary application scenario 100 of a chatbot according to an embodiment.

In FIG. 1, a network 110 is applied for interconnecting among a terminal device 120 and a chatbot server 130. The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, etc. Although only one terminal device 120 is shown in FIG. 1, it should be appreciated that a different number of terminal devices may connect to the network 110.

The terminal device 120 may include a chatbot client 122 which may provide automated chatting service for a user. In some implementations, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 140. The chatbot database 140 may comprise information that can be used by the chatbot server 130 for generating responses.

It should be appreciated that all the network entities shown in FIG. 1 are exemplary, and depending on specific application requirements, any other network entities may be involved in the application scenario 100.

Figure 2:
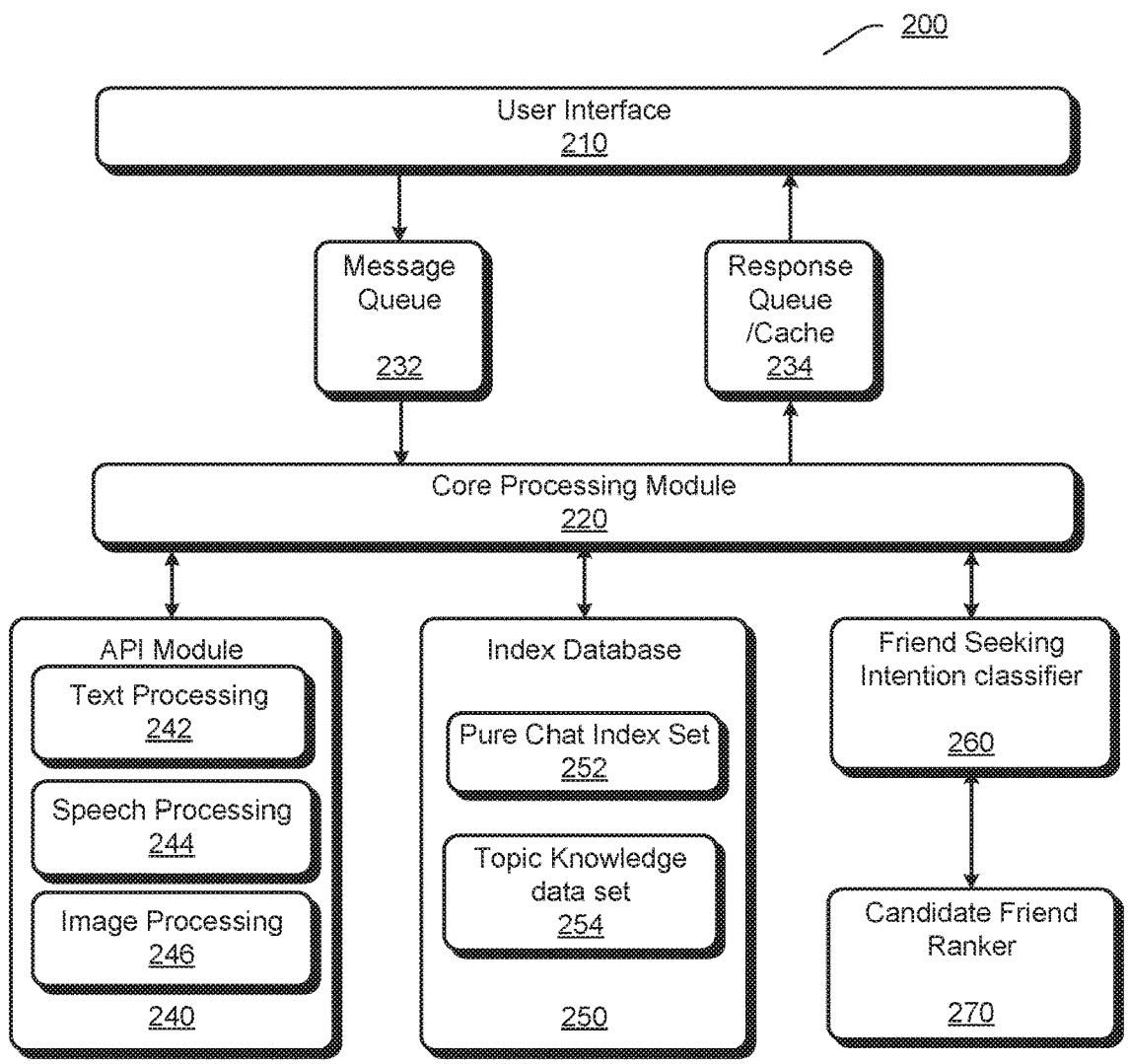
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may include a pure chat index set 252 and a topic knowledge data set 254. The pure chat index set 252 may comprise index items that are prepared for free chatting between users and the chatbot, and may be established with data from social networks. The index items in the pure chat index set 252 may or may not be in a form of question-answer pair. The question-answer pair may also be referred to as message-response pair or query-response pair. The topic knowledge data set 254 may comprise topic knowledge data related to various users and/or user groups. The users or user groups may be users or user groups of the chatbot system 200, and may also be users or user groups of another platform, such as a social network platform. For example, the social network platform may be Twitter, Weibo, and so on. The topic knowledge data may be generated based on user log data of the chatbot system, and may be generated based on web data from the network such as the social network platform or knowledge-style websites like Wikipedia. The topic knowledge data in the knowledge database may also be referred to as topic knowledge graph.

The core processing module 220 may utilize a friend seeking intention classifier 260 to identify whether there is an intention of looking for friends from a message sent from a user. The core processing module 220 may utilize a candidate friend ranker 270 to identify one or more recommended friends for the user based on the topic knowledge graph 254. The candidate friend ranker 270 may identify one or more recommended friends based on ranking scores between the user and the potential friends such as individual users and/or user groups. The information of the identified recommended friends may be taken as a response to the user's message.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message inputted by the player is "Did you eat your breakfast?", two responses may be determined, such as, a first response "Yes, I ate bread" and a second response "How about you? Still feeling hungry?". In this case, through the response cache 234, the chatbot may ensure that the first response is provided to the player immediately. Further, the chatbot may ensure that the second response is provided in a time delay, such as 1 or 2 seconds, so that the second response will be provided to the user 1 or 2 seconds after the first response. As such, the response cache 234 may manage the to-be-sent responses and appropriate timing for each response.

The responses in the response queue or response cache 234 may be further transferred to the user interface 210 such that the responses can be displayed to the user in the chat window.

The user interface 210 may be implemented in the chatbot system 200, and may also be implemented on another platform. For example, the user interface 210 may be implemented on a third party chatting application, such as Line, Wechat and so on. In either of the cases, the users and user groups that are involved with the chatbot are regarded as the users or user groups of the chatbot system.

It should be appreciated that all the elements shown in the chatbot system 200 in FIG. 2 are exemplary, and depending on specific application requirements, some shown elements may be omitted and some other elements may be involved in the chatbot system 200.

Figure 3:
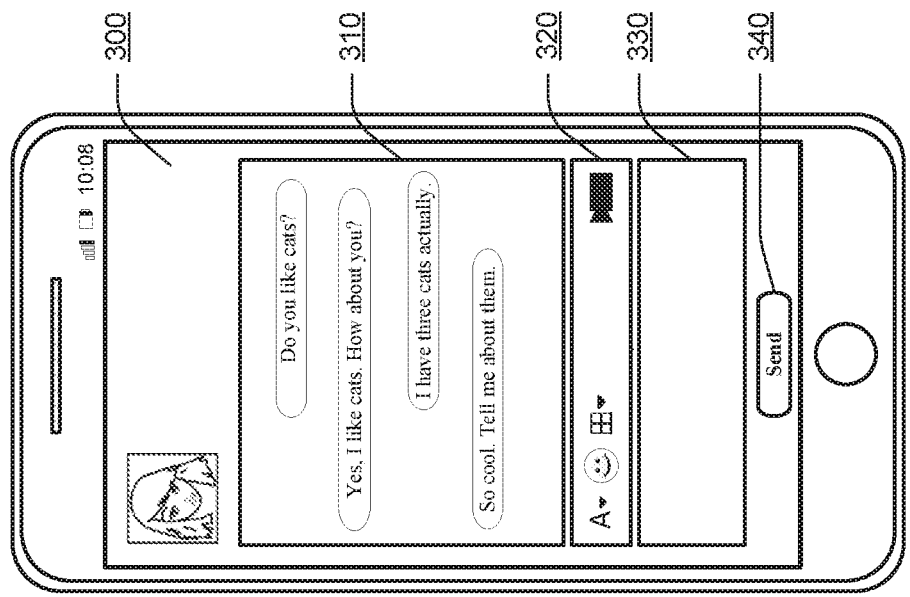
FIG. 3 illustrates an exemplary chat window according to an embodiment.

FIG. 3 illustrates an exemplary chat window 300 according to an embodiment. The chat window 300 may comprise a presentation area 310, a control area 320 and an input area 330. The presentation area 310 displays messages and responses in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used for the user to input messages. For example, the user may type text through the input area 330. The chat window 300 may further comprise a virtual button 340 for confirming to send inputted messages. If the user touches the virtual button 340, the messages inputted in the input area 330 may be sent to the presentation area 310.

It should be noted that all the elements and their layout shown in FIG. 3 are exemplary. Depending on specific application requirements, the chat window in FIG. 3 may omit or add some elements, and the layout of the elements in the chat window in FIG. 3 may also be changed in various manners.

Figure 4A:
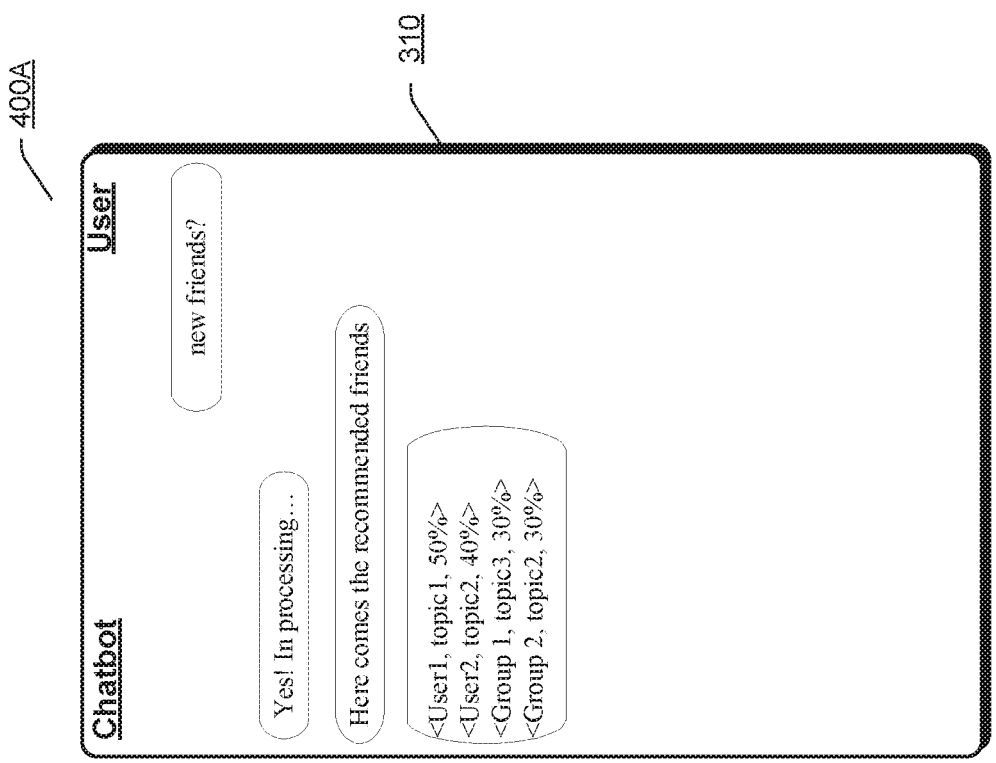

FIG. 4A illustrates an exemplary chat flow 400A according to an embodiment. Only the presentation area 310 of the UI is illustrated in FIG. 4A. In the exemplary chat flow 400A, the chatbot supplies friend recommendation in response to the user's messages or queries.

When the user inputs a message "New friends?", the chatbot may identify an intention of finding friends from the message by using the friend seeking intention classifier 260. The friend seeking intention classifier 260 may be a binary classifier such as a machine learning model, which is trained to classify the query as having an intention of looking for friends or not having such an intention. The friend seeking intention classifier 260 may also be a multiple classifier which is trained to classify the query as having an intention of looking for friends, or having other intentions.

After identifying the intention of finding friends from the message, the chatbot utilizes the candidate friend ranker 270 to find recommended friends for the user based on the topic knowledge graph 254. The topic knowledge graph 254 includes records of various topic information of each of the users or user groups.

The topic knowledge graph 254 may also include location and/or time information associated with a specific record of a topic of a user or user group. For example, if a user sends a message such as "I play basketball every Tuesday evening at No. 8 middle school", the specific record of the topic obtained from this message is "play basketball" or "basketball", the time information related to this record is "every Tuesday evening", the location information related to this record is "No. 8 middle school". As another example, the time information may be the time of sending the message and the location information may be the measured location such as GPS location at the time of sending the message.

The topic knowledge graph 254 may also include degree of interest information associated with a specific record of a topic of a user or user group. The degree of interest indicates how much the user likes or hates the topic. The degree of interest may be obtained by performing sentiment analysis (SA) on the message from which the specific record of topic knowledge is obtained. Taking the above message "I play basketball every Tuesday evening at No. 8 middle school" as an example, the sentiment analysis result about this message may be a value like 0.8 which indicates relative positive sentiment. For example, the sentiment analysis score may be in a range of [0, 1], where 0.5 indicate neutral, the smaller of the score the more negative of the sentiment, and the larger of the score the more positive of the sentiment. In another example, the sentiment analysis score only has three values, that is, 0 indicates a negative sentiment, 0.5 indicates a neutral sentiment, and 1 indicates a positive sentiment.

The topic knowledge graph 254 include records of various topics having been mentioned by the current user and optionally locations, times and interest scores related to the records, therefore the current user's profile in terms of topics are contained in the topic knowledge graph 254. Similarly, other users or user groups' profiles in terms of topics are also contained in the topic knowledge graph 254. Therefore the chatbot may utilize the candidate friend ranker 270 to rank the other users or user groups based on the topic knowledge graph 254 in order to find out the recommended friends. Particularly, the candidate friend ranker 270 may calculate similarity scores between the current user and the other users or user groups, and select the users or user groups with the highest scores as the recommended friends for the current user.

Four recommended friends are illustrated in FIG. 4A. The first item, <User1, topic1, 50%>, indicates that user 1 and the current user have same or similar interest to topic 1, such as play basketball, and the matching degree or probability of user 1 and the current user regarding this topic 1 is 50%. The probability may be the similarity score between the current user and the user 1 regarding the topic 1.

The second item, <User2, topic2, 40%>, indicates that user 2 and the current user have same or similar interest to topic 2, such as play tennis, and the matching probability of user 2 and the current user regarding this topic 2 is 40%.

The third item, <Group 1, topic3, 30%>, indicates that user group 1 and the current user have same or similar interest to topic 3, such as movie, and the matching probability of user group 1 and the current user regarding this topic 3 is 30%. For example, the user group 1 may be movie topic group.

The fourth item, <Group 2, topic2, 30%>, indicates that user group 2 and the current user have same or similar interest to topic 2, such as play tennis, and the matching probability of user group 2 and the current user regarding this topic 2 is 30%. For example, the user group 2 may be tennis amateurs group.

It should be appreciated that the users or user groups are not limited to those of the chatbot system, and may be those of other platform, such as social network like Titter, Weibo or the like. In this aspect, cross-platform recommendation of friends may be implemented by the chatbot.

The user 1 may be the name of the user, and may also be a link to the user. The current user may tap the "user 1" element to reach an interface for adding or requesting the user 1 to be friend. For example, the user 1 may be a user of the chatbot system or a third party chatting system such as Line or Wechat, and the current user may send a request for being friend with user 1. For example, the user 1 may be a user of a social network such as Twitter or Weibo, the current user may add a subscription of the user 1 on the social network. Similarly, the group 1 may be the name of the user group, and may also be a link to the group. The current user may tap the "group 1" element to reach an interface for joining the group 1.

The current user may send a text message or speech message such as "user 1" in the chatting flow. In response to the user's message, the chatbot may open the interface for adding or requesting the user 1 to be friend. The current user may send a text message or speech message such as "group 1" in the chatting flow. In response to the user's message, the chatbot may open the interface for requesting joining the user group 1.

FIG. 4B illustrates an exemplary chat flow 400B according to an embodiment.

When the user inputs a message "anyone who can play tennis with me around?", the chatbot may identify an intention of finding friends from the message by using the friend seeking intention classifier 260. In addition to the intention, the topic information "play tennis" and the location information "around" are obtained from the message, here the location information may be determined based on the current physical position such as GPS position of the current user. Syntax and semantic analysis process may be used to identify the topic information and the location information from the message.

Then the candidate friend ranker 270 identifies recommended friends for the user based on the topic knowledge graph 254 and the location information. Since the finding of recommended friends may need an appreciable time period, a small talk such as "Yes! Playing tennis is fun! In processing . . . " may be output by the chatbot.

Four recommended friends are illustrated in FIG. 4B. The first item, <User1, location1, 50%>, indicates that user 1 is possible to play tennis with the current user at location 1 with a probability of 50%. The probability may be the similarity score between the current user and the user 1 regarding the topic of tennis. The second item, <User2, location2, 40%>, indicates that user 2 is possible to play tennis with the current user at location 2 with a probability of 40%. The third item, <Group 1, location3, 30%>, indicates that user group 1 is possible to play tennis with the current user at location 3 with a probability of 30%. The fourth item, <Group 2, location4, 30%>, indicates that user group 2 is possible to play tennis with the current user at location 4 with a probability of 30%.

FIG. 4C illustrates an exemplary chat flow 400C according to an embodiment.

When the user inputs a message "anyone who can play tennis in the evening?", the chatbot may identify an intention of finding friends from the message by using the friend seeking intention classifier 260. In addition to the intention, the topic information "play tennis" and the time information "evening" are obtained from the message. Syntax and semantic analysis process may be used to identify the topic information and the time information from the message.

Then the candidate friend ranker 270 identifies recommended friends for the user based on the topic knowledge graph 254 and the time information. Four recommended friends are illustrated in FIG. 4C. The first item, <User1, location1, time1, 50%>, indicates that user 1 is possible to play tennis with the current user at location 1 and time 1 with a probability of 50%. The probability may be the similarity score between the current user and the user 1 regarding the topic of tennis. The second item, <User2, location2, time 1, 40%>, indicates that user 2 is possible to play tennis with the current user at location 2 and time 1 with a probability of 40%. The third item, <Group 1, location3, time 2, 30%>, indicates that user group 1 is possible to play tennis with the current user at location 3 and time 2 with a probability of 30%. The fourth item, <Group 2, location4, time 3, 30%>, indicates that user group 2 is possible to play tennis with the current user at location 4 and time 3 with a probability of 30%.

Figure 4D:
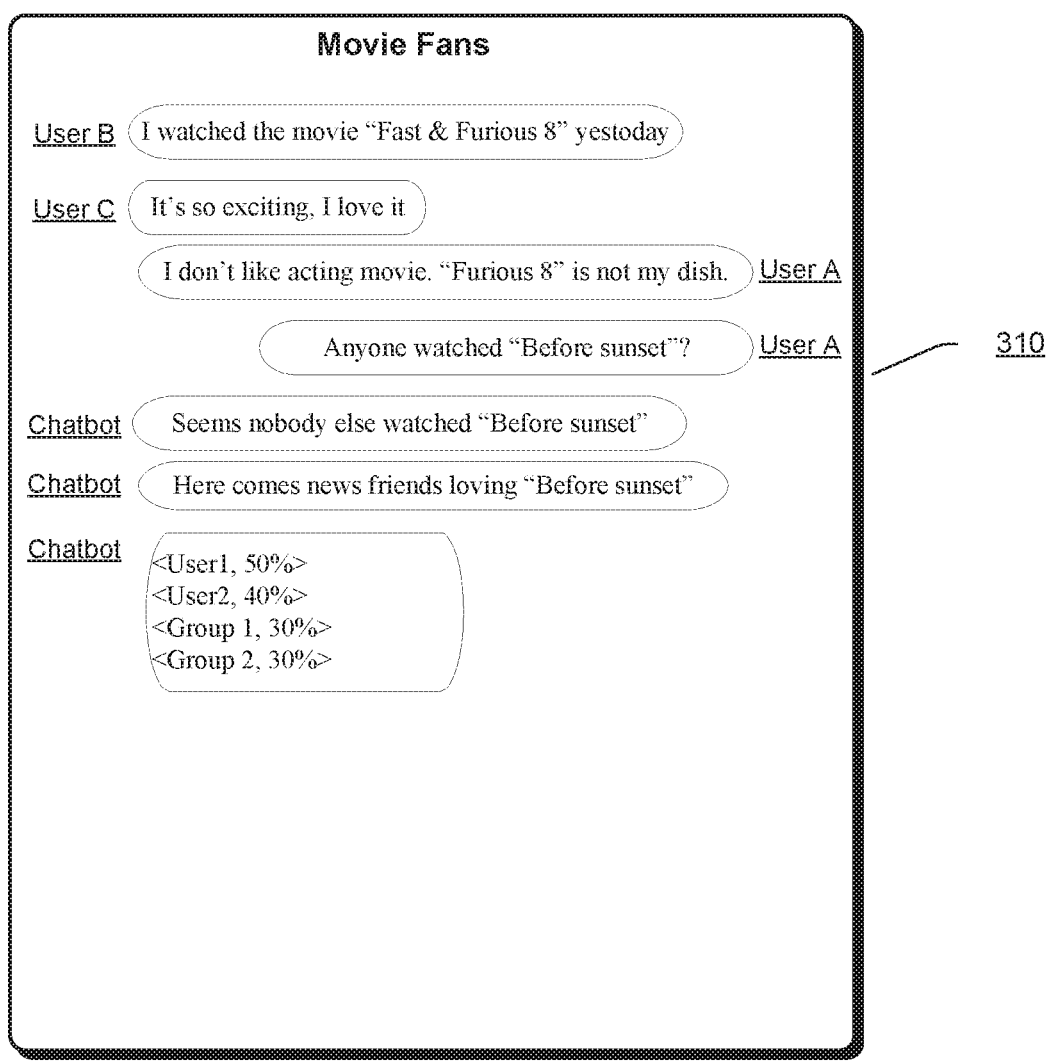

FIG. 4D illustrates an exemplary chat flow 400D according to an embodiment. The chat flow 400D involves a group of participants including users such as user A, user B, user C and the chatbot. The group of participants may be referred to as interest group or user group. The name of the interest group is "movie fans" in this example. There are various kinds of interest groups, such as movie star groups, soccer groups, tennis groups, sport groups, fitness groups, celebrity groups, working groups and so on.

When the user A inputs a message "Anyone watched "Before sunset"?", the chatbot may identify an intention of finding friends from the message by using the friend seeking intention classifier 260, and may identify the topic information "Before sunset" from the message.

In a scenario, if no user makes a response to the message of user A in a predetermined time period, the chatbot may look for new friends outside the current interest group based on the topic knowledge graph 254 and the topic information "Before sunset". The friends may be recommended to the user A or the current group.

Four recommended friends are illustrated in FIG. 4D. The first item, <User1, 50%>, indicates that user 1 has a matching probability of 50% with regard to the topic "Before sunset". The second item, <User2, 40%>, indicates that user 2 has a matching probability of 40% with regard to the topic "Before sunset". The third item, <Group 1, 30%>, indicates that user group 1 has a matching probability of 30% with regard to the topic "Before sunset". The fourth item, <Group 2, 30%>, indicates that user group 2 has a matching probability of 30% with regard to the topic "Before sunset".

User A or another user such as user B or C may operate based on the recommended friends. For example, user A may output a text or speech message to ask the chatbot to invite user 1 and/or user 2 to join the current group, or ask the chatbot to invite user A to group 1 and/or group 2. For example, the user A may tap one of the multiple recommended friends to reach a communicating interface or reach an interface for adding friends, inviting the corresponding user 1 or 2 to join the current group, or requesting to join the corresponding group 1 or 2. It should be appreciated that any suitable operations based on the recommended friends are within the scope of the disclosure.

Figure 5:
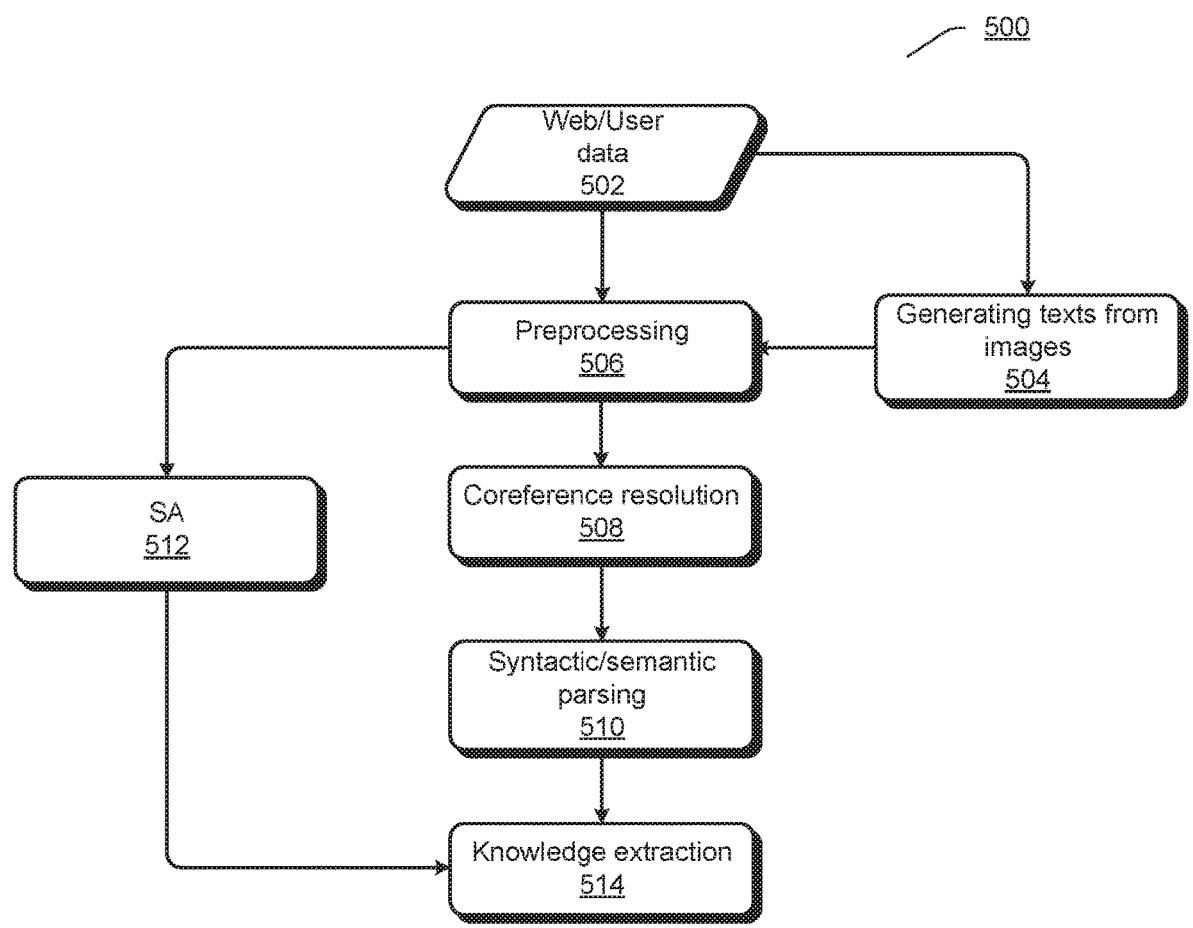
FIG. 5 illustrates an exemplary process for constructing user-topic knowledge graph according to an embodiment.

FIG. 5 illustrates an exemplary framework for creating a user-topic knowledge graph according to an embodiment.

As shown at 502, two kinds of data, the web data and the user log may be used to create the user-topic knowledge graph. The user data contains texts and images that a user sent to the chatbot system. The web data also contains texts and images related to a user of another platform such as social network like Twitter and Weibo. The web data may also contain data from knowledge based website such as Wikipedia. For example, a big V user of a social network is typically a celebrity, the user-topic knowledge data for the big V user may be obtained from the social network, and supplementary knowledge about the big V user may be obtained from the knowledge based website such as Wikipedia. The knowledge data from both the social network and the knowledge based website may be used to construct the user-topic knowledge graph for the specific user. It should be appreciated that it may be possible that only the user data is used to create the knowledge graph. It should be appreciated that the user data may be user log data and the creating or updating of the knowledge graph may be performed periodically or in real time.

At 504, an image may be converted to a text message describing the images. This converting may be performed at the image processing module 246. In an implementation, a recurrent neural network (RNN)-convolution neural network (CNN) model is employed to generate a text message from an image.

At 506, the texts of the user data or web data or the texts generated from the images are preprocessed. In an implementation, the preprocessing may include a sentence segmentation and word segmentation, Part-of-speech (POS) tagging, noun phrase extraction, named entity recognition (NER).

The sentence segmentation utilizes the punctuations such as period, question mark, exclamation mark and so on to separate a document into a set of sentences. The word segmentation separates words as well as punctuation by adding for example space symbol among them. Part-of-speech (POS) tagging is used to add POS tag for words in the sentence. Then, given a POS-tagged sequence or sentence, the noun phrase extraction process may be performed to recognize noun phrases using a list of heuristic rules. Then, the NER process may be used to identify the named entities in the sequence or sentence, the named entity may be person's name, location, organization, and phrases that describe timestamp or time period. For example, in FIG. 6, for one sentence of "I brought Chihuahua back to home two years ago", "Chihuahua" is recognized as dog name, "home" is a location name, "two years ago" is the timestamp in units of year.

Each of the sentence/word segmentation, POS tagging, noun phrase extraction, NER employed in the preprocessing stage may be implemented by using existing techniques. However it should be appreciated that the combination of these processes in the preprocessing stage can effectively extract necessary information from sentences in order to construct the user-topic knowledge graph which is also sensitive to the topic related time and location information.

At 508, a coreference resolution of pronouns and normal nouns may be performed for the sentences. Taking the user log data 610 illustrated in FIG. 6 as an example, the user log data "Rinna, do you like Chihuahua?", "Wonderful, I have one in my home. I brought him back to home two years ago." may be preprocessed at 508 to obtain the texts "Rinna, do you like Chihuahua?", "Wonderful, I have Chihuahua in my home." and "I brought Chihuahua back to home two years ago." shown at 630.

A machine learning model referred to as coreference resolution model may be trained to compute the probabilities of the candidate named entities for one given pronoun such as "he", "she" and so on, or for one given normal noun such as "the director", "the CVP" and so on.

Suppose wi is one named entity, such as "Chihuahua" in the sentence shown at 620, and wj is another noun phrase, such as "one" in the sentence shown at 620, the task of the coreference resolution model is to determine whether wi and wj have the similar meaning or pointing to the same entity. In an implementation, the following features are utilized in the coreference resolution model.

Whether wi and wj appear in one sentence;
Is wi a pronoun?
The edit distance between wi and wj in character level;
Are wi and wj share a same POS tag?
When a word is a pronoun, whether another word is a name?

By using these features, a similarity score between the two words may be computed and a binary result indicating whether the two words refer to the same entity may be obtained. It should be appreciated that more or less features may be used for the coreference resolution model.

As illustrated at 630 of FIG. 6, the coreference resolution model may identify that the pronoun "one" and "him" point to the same entity as "Chihuahua", and thus the pronouns "one" and "him" are replace with the named entity "Chihuahua".

At 510, a syntactic and semantic parsing process may be performed on the text sequences or sentences to obtain the syntactic dependency structure and semantic role labeling of the sentences. An example of the syntactic dependency structure and semantic role labeling of the sentences is illustrated at 640 of FIG. 6, where the structures and labeling are denoted by the arcs.

At 514, topic knowledge may be extracted from the sentences. Taking the sentences illustrated at 640 as an example, the topic "have Chihuahua in home" or "Chihuahua", location information "home" is obtained from the text of the sentence "Wonderful, I have Chihuahua in my home.", time information is identified as the time at which the sentence was sent in the automated chatting. For example, the time is 2017 as shown in 650 of FIG. 6. It should be appreciated that the time may be in finer unit such as month, day, hour, minute or the like. The topic "brought Chihuahua back to home" or "Chihuahua", location information "home", and time information "two years ago" is obtained from the text of the sentence "I brought Chihuahua back to home two years ago". For example, the time of this item of topic information is 2015 by subtracting 2 years from the above time 2017, as shown in 650 of FIG. 6.

At 512, sentiment analysis (SA) may be performed to the sentence to evaluate the attitude of the user to the topic contained in the sentence. The SA score indicates the user's attitude and may be referred to as degree of interest. The SA score may be in a range of [0, 1], where 0.5 indicate neutral, the smaller of the score the more negative of the sentiment, and the larger of the score the more positive of the sentiment. For example, a SA score such as 0.8 may be obtained for the illustrated sentence "Wonderful, I have Chihuahua in my home". On the other hand, a SA score such as 0.1 may be obtained for a sentence "I don't like Chihuahua actually", this indicates a negative interest of the topic contained in the sentence. In an implementation, the SA score may be used as an element of the knowledge data at 514.

As illustrated at 650 of FIG. 6, the user-topic knowledge data may be obtained for the user A in a format of tuples, that is, <user A, 2015, home, Chihuahua, brought, 0.8>, <user A, 2017, home, Chihuahua, in, 0.8>. In addition to the topic information such as "Chihuahua, brought, home", "Chihuahua, in, home", there are location information such as "home", time information "2015", "2017", and degree of interest information "0.8".

Based on the factor of degree of interest or SA score in the user-topic knowledge data, two users having same or similar attitude, either positive or negative, to a same or similar topic may be given a bigger weight for ranking their matching rate, and on the other hand, two users having opposite attitudes, one is positive and the other is negative, to a same or similar topic may be given a smaller weight for ranking their matching rate.

Based on the factor of location and/or time in the user-topic knowledge data, two users that had same or similar time slots and/or locations with respect to a same or similar topic may be given a bigger weight for ranking their matching rate. For example, two tuples or records shown at 650 are generated from the user log data 610 although both of them are related to the same topic "Chihuahua", where different time information is provided at the two tuples. This makes the matching of users sensitive to the time factor of the topic knowledge graphs. This principle is similar to the location factor of the topic knowledge graph. Therefore the tuples or records of topics knowledge obtained from the user data of a user form a profile for the user in terms of topic, topic related time information, topic related location information, topic related sentiment information.

It should be appreciated that the disclosure is not limited to the format of tuples which include all kinds of elements described above, it's applicable that each tuple includes more or less elements.

The construction of user-knowledge graph based on user data is described above with reference to FIG. 5. The web data may also be used to obtain the user-knowledge data through the process of FIG. 5.

The web data may include user log data of a user in a third party platform such as Twitter or Weibo. This kind of web data may also be referred to as user data in substance. And a user-topic knowledge data may be constructed for such a third party platform based on the third party platform user data. Then a cross-platform friend recommendation may be performed by using this user-topic knowledge data.

The web data may also include data about some special user such as a celebrity. The user-topic knowledge data obtained from this kind of web data through the process of FIG. 5 may be used as a supplementary user-topic knowledge data for such a user, in order to enrich the profile of the user in terms of the topic knowledge.

For example, assuming Frank is a big V user on the social network, the user-topic knowledge graph may be obtained for the user based on the user's log data on the social network through the process of FIG. 5. In addition, common knowledge about Frank may be obtained from knowledge based website since Frank is a famous person. Example of the common knowledge content may be "Frank was born in Taiyuan Shanxi in 1966", "Frank was accepted by the university at 12" and "Frank graduated from University of Science and Technology of China", from which the user-topic knowledge tuples may be obtained like <1966, Taiyuan Shanxi, Frank, born, 0.5>, <1978, University of Science and Technology of China, Frank, join, 0.5>, <1982, University of Science and Technology of China, Frank, graduate, 0.5>, through the process of FIG. 5. The generated user-topic knowledge tuples may be supplemented for the user Frank, and may be helpful for recommending the user Frank to another user based on the topics, topic related time and location.

Figure 7:
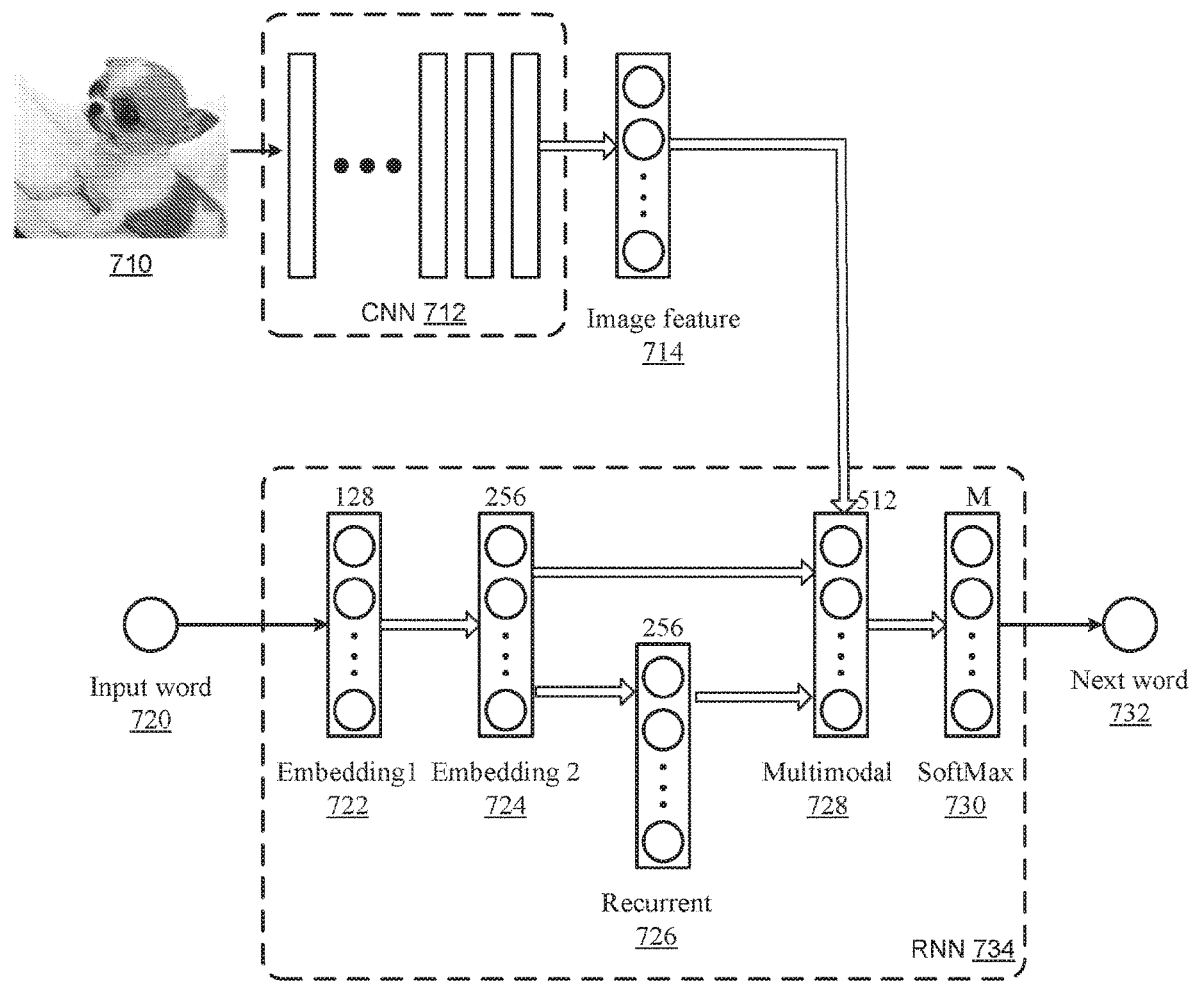
FIG. 7 illustrates an exemplary neural network for generating text from an image according to an embodiment.

FIG. 7 illustrates an exemplary image-text conversion model according to an embodiment.

The model is implemented as a CNN-RNN model. The fundamental idea behind this CNN-RNN network is to match a text sentence and an image in a latent semantic space, where the sentence is projected into a dense vector space through a RNN and the image is projected into the other dense vector space through a CNN.

The CNN 712 is a deep CNN, which takes an image as input and project the image into the dense vector space. The output of the CNN is a vector which represents the image feature 714 in the dense vector space. The deep CNN 712 for projecting an image to the dense vector space may be implemented with existing techniques, such as AlexNet deep CNN network.

The RNN 734 is a deep RNN, which takes the image vector 714 as input and generate the sentence describing the image recurrently. The exemplary RNN includes an embedding layer 1 722, an embedding layer 2 724, a recurrent layer 716, a multimodal layer 728, a softmax layer 730. The image vector is input into the multimodal layer 728, the output of the embedding 2 layer is input into the multimodal layer 728 and the recurrent layer 726, the output of the recurrent layer 726 is input into the multimodal layer 728. The exemplary number 128, 256, 512 shown on top of the layers denote the dimensions of the vector at the layers. It should be appreciated that other value of dimensions may be applicable. The projecting from one layer to another layer is implemented through matrix manipulation to the vectors in the dense vector space. The matrix manipulation based on the illustrated connection of the layers in the RNN would be apparent for those skilled in the art.

The training data for the CNN-RNN model is <image, sentence> pairs, where the image is taken as the input of the CNN-RNN model and the sentence is taken as the output of the CNN-RNN model.

As shown in the FIG. 7, an image 710 of Chihuahua is input into the CNN, and a sentence of "such a cute Chihuahua seating on a pink blanket" is recurrently generated at 732. The decoding process (sentence generating process) is described as follows.

Step 1: the image is input into the deep CNN 712 and a dense vector 714 is obtained for the image. The initial input word 720 is a sentence start flag "<s>", which is denoted as w0 and is input into RNN 734 and converted to a dense vector.

Step 2: the dense vector 714 of the image is sent to the multimodal layer 728 of the RNN network, and softmax function 730 is used to compute the probabilities P(w1|w0, Image) of words in a target vocabulary set, then a word A with the maximum probability is identified as the next word w1 732.

Step 3: the image vector and the previously generated partial sentence, i.e. word w1, is taken as the input to generate the next word w2. The softmax function 730 is used to compute the probabilities P(w2|w1, w0, Image) of words in the target vocabulary set, then a word B with the maximum probability is identified as the next word w2 732.

The step 3 is repeated taking the image vector 714 and the previously generated partial sentence as input, so as to generate the next word wi with the highest probability P(wi|w1, ..., wi-1, Image), where wi is next word candidate and w1 to wi-1 are the already generated words as history. The generating process stops when a </s> symbol which denotes the ending of a sentence is generated.

It should be appreciated that the specific structure of the CNN-RNN of FIG. 7 is for illustration of the disclosure, but the disclosure is not limited thereto. Some reasonable modification may be possible for the structure of the CNN-RNN, and may be applicable in the disclosure.

Figure 8:
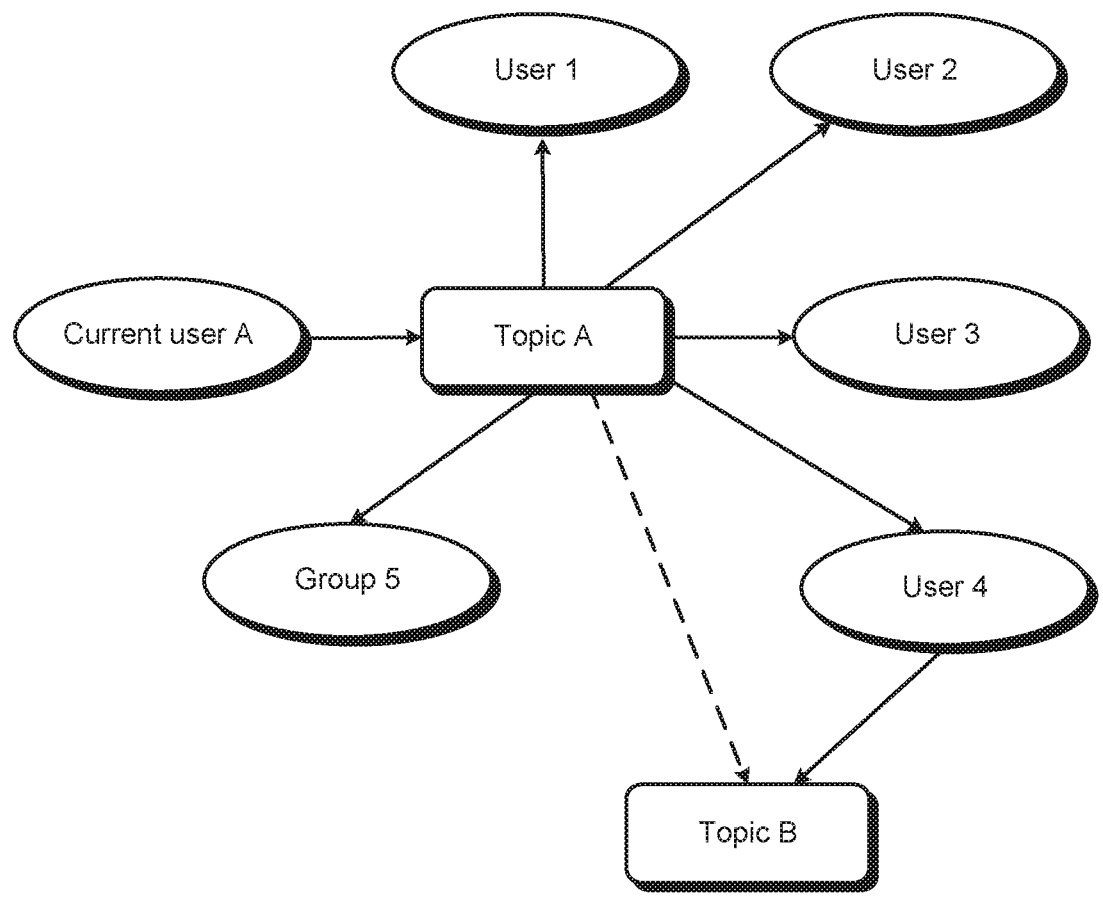
FIG. 8 illustrates an exemplary user-topic connection in user-topic knowledge graph according to an embodiment.

FIG. 8 illustrates an exemplary proactive updating process of knowledge graph according to an embodiment.

When one user A's one topic event, such as the two tuples related to the topic "Chihuahua" shown at 650 of FIG. 6, is collected and uploaded to the user-topic knowledge graph, there is a transfer action that starts from the current user A, through current topic A, to other users and/or user groups in the existing knowledge graph.

As illustrated in FIG. 8, when the topic A of the current user A is added to the user-topic knowledge graph, there may be a transfer from the topic A to other uses, such as User 1 to Group 5 as illustrated, who are already existing in the user-topic knowledge graph. The target of this transfer action is to activate again these users such as User1 to Group 5 in case that these users are not active to this topic for a relatively long time.

In an implementation of the transfer action, a part of the users and/or user groups having the same topic A in the user-topic knowledge graph is selected, and soft questions of whether it still has an opinion to the Topic A is sent to the selected users and/or user groups. The selection of the users/groups may be a random selection. The selection of the users/groups may be not performed, and the soft questions are sent to all the users/groups having the same topic A in the user-topic knowledge graph.

When a message is received in response to the soft question from a triggered user or user group, the topic knowledge may be obtained for the user or user group based on the message through the process of FIG. 5, and the user-topic knowledge graph may be updated by appending the newly obtained topic knowledge of the user or user group.

When a message is not received in response to the soft question from a triggered user or user group, the time information related to the topic A of the triggered user or user groups in the user-topic knowledge graph may be checked. If the time information indicates the user has not been active for this topic A for a long time such as a threshold like one year or six month, the records of topic A of this triggered user may be deleted from the user-topic knowledge graph. In an implementation, the time information may be the time of generating the record of topic A related to the triggered user or user group. For example, if the generating time has been more than one year from the current time, this record of the topic A related to the triggered user or user group may be deleted.

This proactive triggering of users as illustrated in FIG. 8 can help updating the user-topic knowledge graph and help constructing a relatively fresh user-topic knowledge graph to be used for in-time new friend recommendation.

Furthermore, deep propagation is performed from the selected users to their topics other than the Topic A, such as Topic B. As illustrated in FIG. 8, Topic A and Topic B are linked by a user 4. The more user links topic A and topic B have, the closer relation topic A and topic B has in the user-topic knowledge graph, and thus the relation of topic A and topic B is given a bigger score. It is illustrated that the link between topic A and topic B is via one user, and the relation score may be computed based on the number of such one-user links. It is also possible that the relation score may be computed based on the number of multiple-user links, where the more users in one link between two topics, the smaller weight this link is given when scoring the relation of the two topics.

Through the deep propagation among the topics in user-topic knowledge graph, a topic relation knowledge graph may be constructed or updated. The topic relation knowledge graph describes the relations between each pair of topics in the user-topic knowledge. Since each topic is connected with a number of users, the topic relation knowledge graph implicitly connects two groups of users by linking two topics. The topic relation knowledge graph may be in format of tuples. An example of a tuple is <topic1, topic2, relation score>.

Another example of a tuple is <topic1, topic2, relation, score>. The relation element may be a default value that indicates a general relation, such as the above discussed relation which is established via users.

In some other implementations, the relation may refer to a specific relation between two topics. For example, the topic A "food" and topic B "apple" may be a parent-child relation, the topic A "football" and topic B "basketball" may be a brother-brother relation. The specific relation between two topics may be achieved based on predefined topic-relation rules. In an example, an extra weight may be given for a specific relation of two topics when scoring the relation of the two topics. For example, the brother-brother relation may be given an extra weight compared to the above discussed general relation, and the parent-child relation may be given an bigger extra weight than the brother-brother relation.

The constructing and updating of topic knowledge graph 254 have been described, the topic knowledge graph 254 includes user-topic knowledge graph and topic relation knowledge graph. The user-topic knowledge graph includes tuples such as <user, topic, degree of interest, time, location>, where the user element may be user name or user identification, and the user element also refers to user group. The topic relation knowledge graph includes tuples such as <topic1, topic2, relation, score>. It should be appreciated that some tuples may not necessarily include all the elements, and actually more or less elements in a tuple may be applicable in the disclosure.

Figure 9:
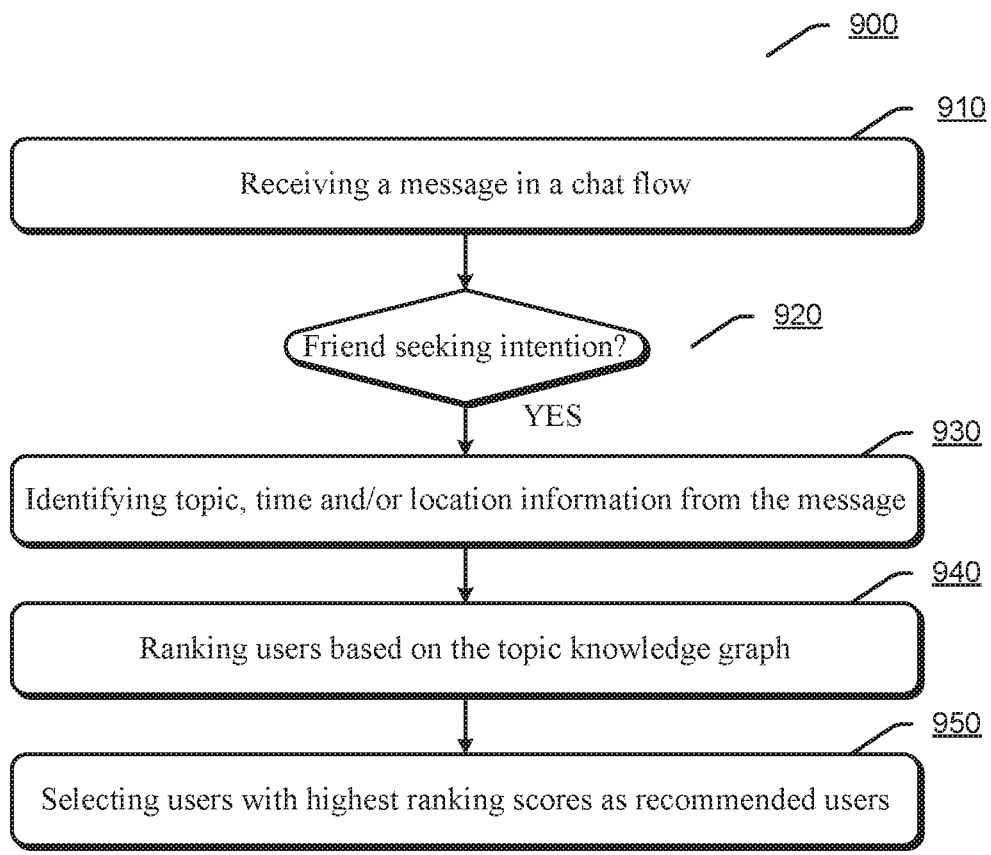
FIG. 9 illustrates an exemplary process for recommending friends in automated chatting according to an embodiment.

FIG. 9 illustrates an exemplary process for recommending friends for a specific user according to an embodiment.

At 910, the chatbot receives a message from a user in a chat flow. The chat flow may involve only the chatbot and the user, or may involve a group of users in a group chatting. For example, the message may be those illustrated in FIGS. 4A to 4D.

At 920, the chatbot determines whether there is an intention of seeking friends in the message by using the friend seeking intention classifier 260. The process goes to 930 if a friend seeking intention is identified from the message.

At 930, the chatbot identifies topic, time and/or location information from the message. It's possible that no topic, time or location information is identified from the message.

At 940, the chatbot ranks potential users based on the topic knowledge graph 254 by utilizing the candidate friend ranker 270. The ranking of the users may be also based on the topic, time and/or location information extracted from the message at 930.

The candidate friend ranker 270 may be implemented by training a pair-wise learning-to-rank (LTR) model that uses gradient boosting decision tree (GBDT) algorithm. The tuples <user, topic, degree of interest, time, location> and <topic1, topic2, relation, score> of the topic knowledge graph are used as inputs for this rank model. Given the specific user (user A) that sent the message, the LTR model computes the similarity score between the specific user A and each of other users and user groups. A probability [0, 1] is output as the similarity score for each user or user group (user B). Various features are used for the GBDT algorithm of the LTR model.

A feature that may be used for the GBDT is the length of the shortest path that link user A with a candidate user B. The user B refers to user or user group B here and in the following paragraphs. The path between two users is illustrated in FIG. 8. The longer the shortest path is, the smaller weight the user B is given.

A feature that may be used for the GBDT is the number of shared topics between user A and user B. The more shared topics user A and user B have, the bigger weight the user B is given.

A feature that may be used for the GBDT is the accumulated relation score of shared topics between user A and user B. For example, there are multiple shared topics between user A and user B, the relation score of each two of the multiple topics provided in the topic relation knowledge graph is accumulated. The bigger the accumulated relation score is, the bigger weight the user B is given.

A feature that may be used for the GBDT is the ratio of shared topics between user A and user B over the sum of the total topics linked with A and B. The ratio is computed by the number of their shared topics divided by the sum of the total topics linked with A and B. The bigger the ratio is, the bigger weight the user B is given.

A feature that may be used for the GBDT is the minimum/average word2vector distance between the topics linked with user A and user B. The word2vector distance reflects a latent semantic similarity between topics such as "Chihuahua" and "Pomeranian". The smaller the minimum/average word2vector distance is, the bigger weight the user B is given.

A feature that may be used for the GBDT is the minimum time distance of the shared topics between user A and user B. For example, for one topic of Chihuahua, if user A upload an image of Chihuahua two days ago, where the time information in the knowledge graph is the time at which user A sent the image, and user B talked about liking Chihuahua two days ago, where the time information in the knowledge graph is the time at which user B sent the related message, then their time distance is 0 for this topic of Chihuahua. The smaller the time distance is, the bigger weight the user B is given.

A feature that may be used for the GBDT is the minimum location distance of the share topics between user A and user B. For example, for one topic of basketball, if user A talked about play basketball at playground A, and user B talked about play basketball at playground B, the location distance is the distance between playground A and playground B. It should be appreciated that the location information may also be GPS position of user A and/or user B when they sent the message about basketball. The smaller the location distance is, the bigger weight the user B is given.

A feature that may be used for the GBDT is the shared topic between user A and user B is positively supported by both users or is negatively supported by both users. For example, if the degree of interest element indicates both user A and user B has a positive sentiment to the share topic, or if the degree of interest element indicates both user A and user B has a negative sentiment to the share topic, the user B is given a bigger weight. If the user A has a positive attitude and the user B has a negative attitude to the shared topic, for example, user A likes Chihuahua while user B hates Chihuahua, the user B is given a smaller weight.

A feature that may be used for the GBDT is the topic obtained from the current message. If a shared topic between user A and user B is same as the topic obtained from the current message, a bigger weight is given to the user B.

A feature that may be used for the GBDT is the minimum time distance between the time obtained from the current message and the time of the shared topics of user B. For a shared topic between user A and user B, the smaller the minimum time distance is, the bigger weight the user B is given.

A feature that may be used for the GBDT is the minimum location distance between the location obtained from the current message and the location of the shared topics of user B. For a shared topic between user A and user B, the smaller the minimum location distance is, the bigger weight the user B is given.

A feature that may be used for the GBDT is the source of the topic knowledge graph. A discount is given to the topic knowledge graph derived from web data in order to deal with the noisy issue of the web data yielded knowledge graph. For example, if the topic knowledge graph of user B is derived from web data, a discount is given to the score of the user B.

It should be appreciated that not all of the above mentioned features are necessary to be employed for the GBDT, more or less features may be applicable in order to rank the users.

Although the topic information obtained from the message of the user A is taken as a feature as discussed above in an implementation, this feature may be not used in another implementation. That is, when the topic information is identified at 930, the LTR model may only traverse the users having this topic information in the user-topic knowledge graph while omitting user not having this topic. In this implementation, the ranking of user at 940 also actually takes the topic information obtained from the message of the user A into consideration.

At 950, users with highest ranking scores are selected as the recommended users for the current user A.

Figure 10:
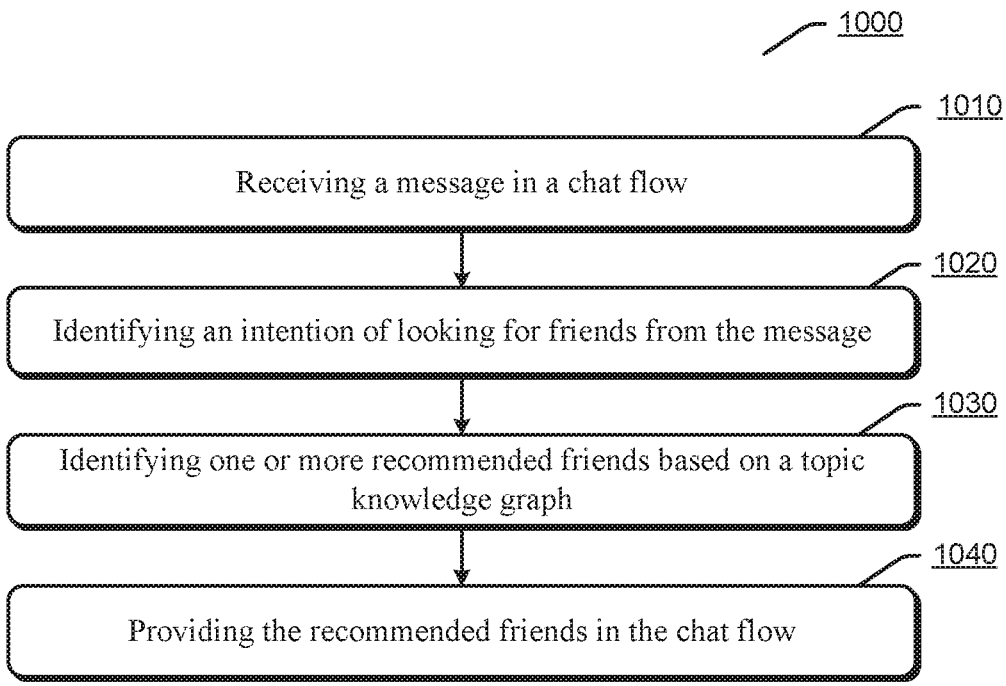
FIG. 10 illustrates an exemplary process for recommending friends in automated chatting according to an embodiment.

FIG. 10 illustrate a process 100 for recommending friends in automated chatting according to an embodiment.

At 1010, a message is received from a user in a chat flow. At 1020, an intention of looking for friends is identified from the message. At 1030, one or more recommended friends are identified based on a topic knowledge graph. At 1040, the recommended friends are provided in the chat flow. The friends comprise individual users and/or user groups.

In an implementation, at least one of topic information, location information and time information is identified from the message. The one or more recommended friends are identified based on the topic knowledge graph and the at least one of topic information, location information and time information.

In an implementation, the recommended friends and at least one of topic information, location information, time information and probability information are provided together in the chat flow.

In an implementation, the topic knowledge graph comprises user-topic knowledge graph, which comprises at least a part of user or group information, topic information, degree of interest information, location information and time information for each of users and/or user groups. The location information is related to a specific record of the topic, and the time information is related to a specific record of the topic.

The topic knowledge graph also comprises topic relation knowledge graph, which comprises topic relation information between topics.

In an implementation, the user-topic knowledge graph is generated for each of the users and/or user groups based on user data and/or web data. The topic relation knowledge graph is generated based on the user-topic knowledge graph.

In an implementation, at least a part of the user or group information, the topic information, the degree of interest information, the location information and the time information are extracted from a text message of the user data and/or web data.

In an implementation, a text message is generated from an image of the user data and/or web data, and then at least a part of the user or group information, the topic information, the degree of interest information, the location information and the time information from the text message.

In an implementation, the text message is obtained from the image through a RNN-CNN model.

In an implementation, the degree of interest information is generated by performing sentiment analysis on the text message. The sentiment analysis score is used as the degree of interest.

In an implementation, the user-topic knowledge graph is in form of tuples, wherein a tuple comprises at least a part of the user or group information, the topic information, the degree of interest information, the time information, and the location information. The topic relation knowledge graph is in form of tuples, wherein a tuple comprises at least a part of a first topic, a second topic, relation of the topics, score.

In an implementation, a topic is extracted from a message of a first user. The topic for the first user is added or uploaded in the user-topic knowledge graph. Then questions related to the topic are sent to second users already having the topic in the user-topic knowledge graph. Answers are obtained from at least a part of the second users. The user-topic knowledge graph is updated based on the answers of the second users. The topic relation knowledge graph is updated based on the updated user-topic knowledge graph.

Figure 11:
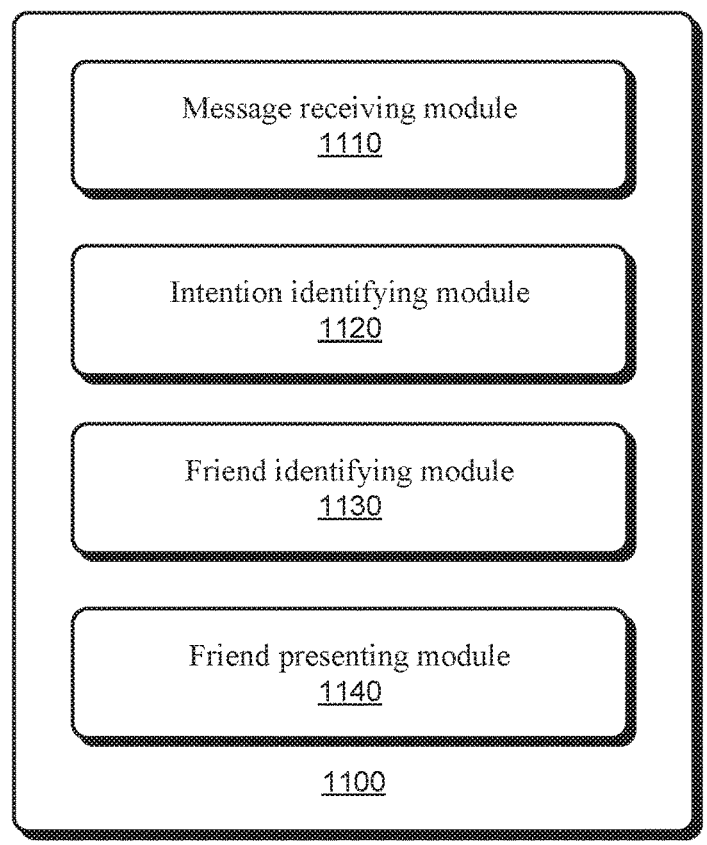
FIG. 11 illustrates an exemplary apparatus for recommending friends in automated chatting according to an embodiment.

FIG. 11 illustrates an exemplary apparatus 1100 for recommending friends in automated chatting according to an embodiment.

The apparatus 1100 includes a message receiving module 1110 for receiving a message from a user in a chat flow, an intention identifying module 1120 for identifying an intention of looking for friends from the message, a friend identifying module 1130 for identifying one or more recommended friends based on a topic knowledge graph, and a friend presenting module 1140 for presenting the recommended friends in the chat flow. The friends comprise individual users and/or user groups.

In an implementation, the apparatus 1100 comprises a message information identifying module for identifying at least one of topic information, location information and time information from the message. The friend identifying module 1130 identifies the one or more recommended friends based on the topic knowledge graph and the at least one of topic information, location information and time information.

In an implementation, the friend presenting module 1140 provides the recommended friends and at least one of topic information, location information, time information and probability information in association in the chat flow.

In an implementation, the topic knowledge graph comprises user-topic knowledge graph, which comprises at least a part of user or group information, topic information, degree of interest information, location information and time information for each of users and/or user groups. The topic knowledge graph comprises topic relation knowledge graph, which comprises topic relation information between topics.

In an implementation, apparatus 1100 comprises a topic knowledge graph generating module for generating the user-topic knowledge graph for each of the users and/or user groups based on user data and/or web data. The topic knowledge graph generating module generates the topic relation knowledge graph based on the user-topic knowledge graph.

In an implementation, the topic knowledge graph generating module generates the user-topic knowledge graph for each of the users and/or user groups by: extracting at least a part of the user or group information, the topic information, the degree of interest information, the location information and the time information from a text message of the user data and/or web data; and/or generating a text message from an image of the user data and/or web data, and extracting at least a part of the user or group information, the topic information, the degree of interest information, the location information and the time information from the text message.

In an implementation, the text message is obtained from the image through a RNN-CNN model.

In an implementation, the topic knowledge graph generating module extracts the degree of interest information by performing sentiment analysis on the text message.

In an implementation, the topic knowledge graph generating module extracts a topic from a message of a first user, adds the topic for the first user in the user-topic knowledge graph, sends questions related to the topic to second users already having the topic in the user-topic knowledge graph, obtains answers from at least a part of the second users, and updates the user-topic knowledge graph based on the answers of the second users.

In an implementation, the topic knowledge graph generating module updates the topic relation knowledge graph based on the updated user-topic knowledge graph.

It should be appreciated that the apparatus 1100 may comprise any other modules configured for performing any operations according to the embodiments of the present disclosure as described in connection with FIGS. 1-10.

Figure 12:
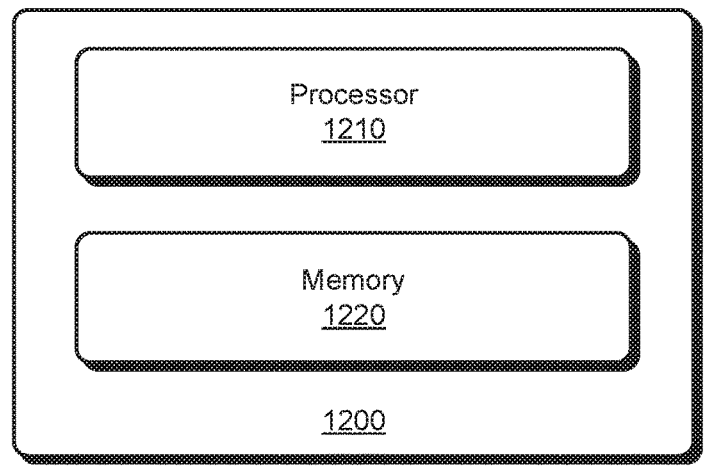
FIG. 12 illustrates an exemplary computing system according to an embodiment.

FIG. 12 illustrates an exemplary computing system 1200 for recommending friends in automated chatting according to an embodiment.

The computing system 1200 may comprise at least one processor 1210. The computing system 1200 may further comprise a memory 1220 that is connected with the processor 1210. The memory 1220 may store computer-executable instructions that, when executed, cause the processor 1210 to receive a message from a user in a chat flow, identify an intention of looking for friends from the message, identify one or more recommended friends based on a topic knowledge graph, and provide the recommended friends in the chat flow.

It should be appreciated that the memory 1220 may store computer-executable instructions that, when executed, cause the processor 1210 to perform any operations according to the embodiments of the present disclosure as described in connection with FIGS. 1-11.

The embodiments of the present disclosure may be embodied in a computer-readable medium such as non-transitory computer-readable medium. The non-transitory computer-readable medium may comprise instructions that, when executed, cause one or more processors to perform any operations according to the embodiments of the present disclosure as described in connection with FIGS. 1-11.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for recommending friends in automated chatting, comprising:
   receiving a message in a chat flow;
   identifying an intention of looking for friends from the message;
   identifying topic information and at least one of location information or time information in text of the message;
   identifying one or more recommended friends based on a user-topic knowledge graph comprising links between topics and users;
   providing an identity for each of the one or more recommended friends in the chat flow, wherein each identity functions as a link to a respective recommended friend;
   providing the at least one of the location information or the time information in the chat flow for each of the one or more recommended friends; and
   receiving a selection of a respective link provided in the chat flow to contact the recommended friend associated with the respective link.

2. The method of claim 1, wherein the friends comprise at least one of individual users or user groups.

3. The method of claim 1, wherein the identifying of the one or more recommended friends comprises identifying the one or more recommended friends based on the user-topic knowledge graph and at least one of the topic information, the location information or the time information.

4. The method of claim 1, wherein the user-topic knowledge graph comprises one or more of user or user group information, topic information, degree of interest information, location information or time information for each user or user group.

5. The method of claim 4, wherein the user-topic knowledge graph comprises a user-topic relation knowledge graph that comprises topic relation information between topics.

6. The method of claim 5, further comprising generating the user-topic knowledge graph for each of the at least one of the individual users or user groups based on user data or web data.

7. The method of claim 6, wherein the generating the user-topic knowledge graph comprises at least one of:
   extracting at least a part of the user or group information, the topic information, the degree of interest information, the location information or the time information from a text message of the user data or the web data; or
   generating a text message from an image of the user data or the web data, and extracting at least a part of the user or group information, the topic information, the degree of interest information, the location information or the time information from the text message.

8. The method of claim 7, wherein the text message is obtained from the image through a RNN-CNN model.

9. The method of claim 7, wherein the extracting of the degree of interest information comprises generating the degree of interest information by performing sentiment analysis on the text message.

10. The method of claim 7, further comprising generating the user-topic relation knowledge graph.

11. The method of claim 7, further comprising:
    extracting a topic from a message of a first user;
    adding the topic for the first user in the user-topic knowledge graph;
    sending questions related to the topic to second users already having the topic in the user-topic knowledge graph;
    obtaining answers from at least a part of the second users; and
    updating the user-topic knowledge graph based on the answers of the second users.

12. The method of claim 5, wherein:
    the user-topic knowledge graph comprises tuples with each tuple including at least a part of the user or group information, the topic information, the degree of interest information, the time information, or the location information; and
    the user-topic relation knowledge graph comprises tuples with each tuple comprising at least a part of a first topic, a second topic, relation of the topics, and a score.

13. The method of claim 1, wherein providing the at least one of the location information or the time information in the chat flow for each of the one or more recommended friends comprises providing the at least one of the location information or the time information and the topic information in the chat flow for each of the one or more recommended friends.

14. An apparatus for recommending friends in automated chatting, comprising:
    one or more processors; and
    a memory storing computer-executable instructions that, when executed by the one or more processors, cause operations to be performed, the operations comprising:
      receiving a message in a chat flow, the chat flow presented in a chat window user interface;
      identifying an intention of looking for friends from the message;
      identifying topic information and first location information that is related to the topic information from the message;
      based on the topic information and the first location information, identifying two or more recommended friends based on a user-topic knowledge comprising links between topics and users, the two or more recommended friends comprising a first recommended friend and a second recommended friend;
      presenting an identity for each of the two or more recommended friends in the chat flow;
      providing second location information in the chat flow for the first recommended friend, wherein the second location information is related to the first location information; and
      providing third location information in the chat flow for the second recommended friend, wherein the third location information is related to the first location information and at least one of the second location information or the third location information differs from the first location information.

15. The apparatus of claim 14, wherein the memory stores further computer-executable instructions for:
    identifying topic information from the message; and
    identifying the two or more recommended friends based on the user-topic knowledge graph and the location information and the topic information.

16. The apparatus of claim 14, wherein the memory stores further computer-executable instructions for presenting the at least one of the two or more recommended friends with probability information in the chat flow.

17. The apparatus of claim 14, wherein the user-topic knowledge graph comprises at least one of:
    at least a part of user or group information, topic information, degree of interest information, location information and time information for each user or user group; or
    a user-topic relation knowledge graph comprising topic relation information between topics.

18. The apparatus of claim 17, wherein the memory stores further computer-executable instructions for generating the user-topic knowledge graph for each of users or user groups based on user data, web data, or both user data and web data by at least one of:
    extracting at least a part of the user information or the group information, the topic information, the degree of interest information, the location information and the time information from a text message of the user data or the web data; or
    generating a text message from an image of the user data or the web data, and extracting the at least a part of the user information or the group information, the topic information, the degree of interest information, the location information and the time information from the text message.

19. The apparatus of claim 18, wherein extracting the degree of interest information comprises extracting the degree of interest information by performing sentiment analysis on the text message.

20. A computer system, comprising:
    one or more processors; and
    a memory storing computer-executable instructions, that when executed by the one or more processors, cause operations to be performed, the operations comprising:
        receiving a message in a chat flow;
        identifying an intention of looking for friends from the message;
        identifying topic information, location information and first time information in text in the message, the location information and the first time information relating to the topic information;
        based at least on the topic information, identifying one or more recommended friends based on a user-topic knowledge graph comprising links between topics and users;
        providing an identity for each of the one or more recommended friends in the chat flow, wherein each identity functions as a link to a respective recommended friend;
        providing the location information and second time information in the chat flow for at least one of the one or more recommended friends, wherein the second time information is based on the first time information; and
        receiving a selection of a respective link provided in the chat flow to enable contact with the recommended friend associated with the respective link.

* * * * *